Jan. 28, 1958     G. I. HOLMES     2,821,206
COMBINED ELECTRORESPONSIVE VALVE AND PRESSURE REGULATORS
Filed April 5, 1951
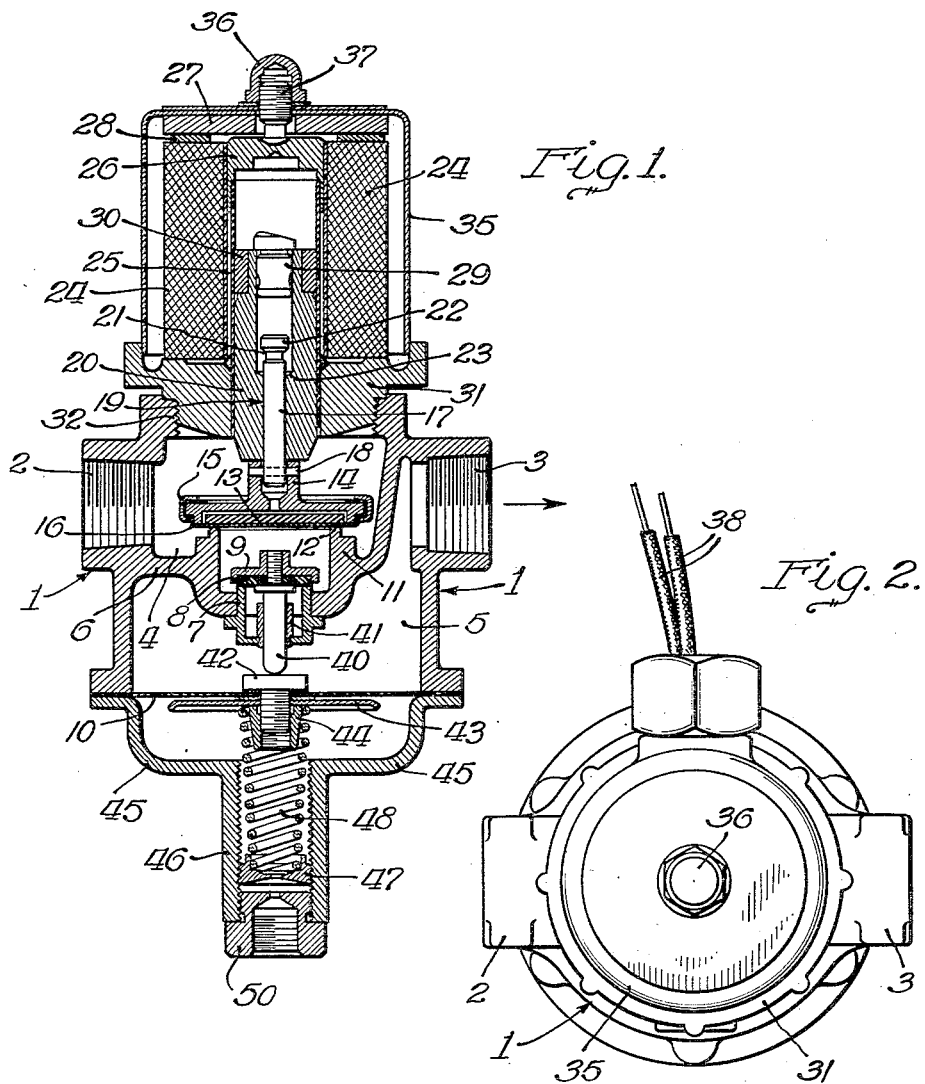
INVENTOR.
Gifford I. Holmes
BY
Attys.

United States Patent Office 2,821,206
Patented Jan. 28, 1958

2,821,206

COMBINED ELECTRORESPONSIVE VALVE AND PRESSURE REGULATORS

Gifford I. Holmes, Waukesha, Wis., assignor to Baso Inc., a corporation of Wisconsin Application April 5, 1951, Serial No. 219,457

2 Claims. (Cl. 137—65)

This invention relates, in general, to a control device for gas burners, and has particular relation to an improved combined electroresponsive valve and pressure regulator for the gaseous fuel.

While the invention has particular utility in automatically controlling the main burner of a furnace, water heater, or other device of this type, it is to be understood that the invention is not limited to this particular use but may be employed for all similar or equivalent purposes as suitable or desired.

One of the main objects of the present invention is to provide an improved combined electroresponsive valve and pressure regulator in which the valve means for electroresponsively controlling the supply of fuel and for regulating the pressure seats with the direction of fuel flow through the device so as not to be unseated by the gas pressure.

Another object of the invention is to provide a device which does not require a separate pressure chamber for the diaphragm, or equivalent pressure responsive device of the pressure regulator, or a tube or equivalent means, for admitting regulating pressure fluid to such a separate chamber from the discharge side of the electroresponsive valve.

Another object of the invention is to provide a device in which the diaphragm or equivalent pressure responsive device forms at least a part of one of the walls of the discharge chamber of the electroresponsive valve so as to be directly responsive to the gas pressure in such discharge chamber.

Another object of the invention is to provide a device in which there is combined with a diaphragm or equivalent pressure responsive device forming at least a part of one of the walls of the discharge chamber of the electroresponsive valve a pressure regulator stem which coacts with the pressure responsive diaphragm and with the pressure regulating valve.

Another object of the invention is to provide a device in which there may be a single valve member operated by the electroresponsive means and by the diaphragm or equivalent pressure responsive device which forms at least a part of one of the walls of the discharge chamber of the electroresponsive valve.

Further features and advantages and numerous adaptations of the invention will be apparent from the following detailed description and the accompanying drawings.

In the drawings:

Figure 1 is a vertical axial section through a combined electroresponsive valve and pressure regulator valve embodying the present invention; and Figure 2 is a top plan view of the valve shown in Figure 1.

The embodiment of the invention shown in Figures 1 and 2, comprises a valve body 1 having a gaseous fuel inlet 2 and a gaseous fuel outlet 3. The direction of gas flow through the device is indicated by the arrow in Figure 1.

The inlet 2 opens into an inlet chamber 4, and the outlet 3 opens from a chamber 5 which constitutes a combined discharge or outlet chamber and pressure chamber. The chambers 4 and 5 are separated by a wall or partition 6 provided with an opening in which is mounted a tubular valve seat member 7. The valve seat member 7 has at its upper end an annular tapered valve seat with which the yielding valve disc 8 carried by a valve cup 9 cooperates and against which the valve disc 8 is adapted to seat. The valve disc 8 and the cup 9 constitute a pressure regulating valve, movement of which is effected with respect to the valve seat 7 by a diaphragm 10 as a simple and convenient gas pressure regulator.

The wall or partition 6 adjacent to the valve 8 is of cup-shaped form at 11, with the valve 8 operating within such cup-shaped formation 11 of partition 6. The cup-shaped formation 11 provides within the inlet chamber 4 an upstanding annular valve seat 12 with which the electroresponsive valve cooperates for regulating flow of gas and against which it is adapted to seat to shut off the flow of gas through the device. The electroresponsive valve comprises a yielding valve disc or pad 13 carried by a valve cup 14. A clamp ring is shown at 15, and a diaphragm may be provided as shown at 16.

The electroresponsive valve is shown in the form of a solenoid valve. Its stem 17, which is preferably non-magnetic and extends at its lower end telescopically into the hub of the valve cup 14 is secured therein, for example, by a pin 18. The stem 17 is slidable in a bore 19 which extends longitudinally through the solenoid plunger or armature 20. The plunger 20 is counterbored at 21, and the stem 17 has a head 22 outwardly beyond the shoulder 23 with the parts positioned as shown. Upon outward movement of the plunger 20 in response to energization of the magnet coil 24, the shoulder 23 engages the head 22 with a hammer-like blow positively to release the valve 13 from its seat, and thereupon continued outward movement of the plunger 20 lifts the valve 13 to open position.

The armature or plunger 20 is slidable in a guide tube 25 which is preferably formed of non-magnetic material. The tube 25 is closed at its outer end by a plug 26 which is also preferably formed of non-magnetic material. The magnet coil 24 surrounds the upper or outer portion of the tube 25, and upon energization draws the plunger 20 outwardly toward the plug 26. A magnetic flux washer 27 is provided above the upper end of the coil 24 preferably with a gasket 28 interposed therebetween. The upper end of the bore 19 in the plunger 20 is closed by a plug 29, and a shading ring is provided at 30.

The lower end of the tube 25 is fixed in a tube support 31 which is threaded into the valve body 1 at 32. A gasket (not shown) may be interposed between the valve body 1 and the tube support 31. The coil 24, flux washer 27 and related parts are enclosed within a solenoid hood 35 which is clamped in placed by a cap nut 36 screwed on a threaded stud 37 carried by the plug 26.

Electric power for energizing the coil 24 is supplied by insulated conductors shown at 38 in Figure 2. These conductors 38 may be connected to any suitable source of electric current, for example, through a step down transformer to the line wires adjacent to where the device is installed. The line conductors may lead, for example, from a suitable source of alternating current, such as a household or commercial current supply line of the type which averages about 115 volts.

The valve cup 9, which carries the valve disc 8, is disposed coaxially with respect to the valve disc 13 and is screwed upon the upper end of a valve stem 40. The valve stem 40 has axial reciprocatory movement in a stem guide 41 carried in an opening in the lower end wall of the valve seat member 7. At its lower end the stem 40 is rounded for cooperation with the headed upper end of a screw 42.

The diaphragm 10, at its axis, is clamped between a washer 43 and the head of the screw 42. The threaded shank of the screw 42 passes through an axial opening in the diaphragm 10 and is screwed into a nut 44. The outer periphery of the diaphragm 10 is clamped between a flange on the open lower end of the discharge chamber portion of the valve body 1, and the cooperating flange of a cover 45. The cover 45 has an integral and axially disposed tubular portion 46 into which is screwed an adjusting nut 47. A coiled spring 48 is interposed between the washer 43 and the adjusting nut 47. The spring 48 is biased upwardly and is adapted as described below to unseat or open the valve 8, and the pressure adjusting action of the diaphragm and its valve are adjusted by adjusting the screw 47 in the tubular part 46. A cover nut 50 is screwed in the lower end of the tubular part 46 and closes the same.

The operation of the device is as follows:

When the electric circuit through the coil 24 is closed, the plunger 20 is drawn upwardly and actuates the valve 13 to open position where it remains as long as the coil 24 is energized. The spring 48 yieldingly holds the valve 8 open, and therefore gaseous fuel enters through the inlet 2 and flows through the inlet chamber 4, valve seat member 7, outlet chamber 5, and out through the outlet 3 in the direction indicated by the arrow in Figure 1, for example, to a main gaseous fuel burner.

The gaseous fuel in its flow through the outlet chamber 5 acts in said chamber directly upon the diaprhagm 10. An increase in pressure will flex the diaphragm downwardly against the force of the spring 48 with accompanying movement of the valve 8 toward its seat 7. Movement of the valve 8 is thus effected with respect to the valve seat 7 by the pressure of the gaseous fuel within the outlet chamber 5 on the diaphragm 10 and in amount which varies with the pressure. The closer the valve 8 approaches its seat 7 the greater is the pressure drop through the valve seat member 7. A simple and convenient gas pressure regulator is thus provided.

Upon deenergization of the coil 24, for example, by opening of a thermostat, limit switch or other condition responsive device in the circuit for this coil, the plunger 20 is released and drops by gravity, closing the valve 13 with impact or with a hammer-like blow, and holding the valve 13 closed as long as the coil 24 is deenergized.

It will be noted that in the embodiment of the invention disclosed the electroresponsive means is free of the weight of the pressure responsive means in operating the shut-off valve to open position and holding same open; also that the pressure responsive means and the electroresponsive means are located beyond opposite ends of the port means, and that the actuating stem 40 is disposed for operation within the port means and cooperates with the valve means at one end and with the pressure responsive means at the opposite end.

The embodiment of the invention shown in the drawings is for illustrative purposes only, and it is to be expressly understood that said drawings and the accompanying specification are not to be construed as a definition of the limits or scope of the invention, reference being had to the appended claims for that purpose.

I claim:

1. In an apparatus for controlling the flow of fluid fuel, a unitary valve body having an inlet and an outlet and formed with a single cup-shaped partition therebetween, said cup-shaped partition being formed with a bore and a counterbore, the latter defining a first upstanding valve seat on the inlet side of said partition, a unitary tubular valve seat and valve guide member mounted in said bore and forming a second upstanding valve seat also on the inlet side of said partition and disposed within said counterbore below said first valve seat, electroresponsive flow control means comprising a flow control member cooperating with said first seat to control flow therethrough, said electroresponsive control means when deenergized urging said control member to a flow-preventing position and when energized moving said control member to a flow-permitting position with respect to said first seat, pressure responsive flow control means comprising a valve member cooperable with said second seat for variation of the flow-permitting area therebetween, said valve member comprising an annular cup-shaped portion having a peripheral lip larger than said bore and smaller than said counterbore and formed with a raised central portion having a threaded aperture therein, a resilient valve disc also formed with a central aperture and disposed within said cup-shaped valve member portion for yielding engagement with said second valve seat, a flexible diaphragm on the outlet side of said valve partition in the path of the fluid flow, means biasing said diaphragm toward said valve member and against the outlet pressure when said flow control member is in flow-permitting position, and connections between said diaphragm and said valve member comprising a valve stem extending through said unitary valve seat and guide member and formed with a threaded extension which extends through the aperture in said valve disc for engagement with said threaded aperture in said cup-shaped valve portion and formed with a radially extending shoulder, engagement of said stem and valve portion causing said shoulder to abut and hold said resilient disc in fixed relation to said cup-shaped portion and said stem, said stem being rounded at the opposite end for abutting engagement with said diaphragm.

2. In an apparatus for controlling the flow of fluid fuel, a unitary valve body having an inlet and an outlet and formed with a single cup-shaped partition therebetween, said cup-shaped partition being formed with a bore and a counterbore, the latter defining a first upstanding annular tapered valve seat on the inlet side of said partition, a unitary tubular valve seat and valve guide member mounted in said bore and forming a second upstanding annular tapered valve seat also on the inlet side of said partition and disposed within said counterbore coaxial with and spaced below said first valve seat, electroresponsive flow control means comprising an operator and a flow control member cooperable with said first valve seat, said operator when deenergized urging said flow control member to a flow-preventing position and movable by said operator when energized to a flow-permitting position, pressure responsive flow control means compromising a valve member disposed within said counterbore and cooperable with said second seat for variation of the flow-permitting area therebetween, said valve member comprising an annular cup-shaped portion having a peripheral lip larger than said bore and smaller than said counterbore and formed with a raised central portion having a threaded aperture therein, a resilient valve disc also formed with a central aperture and disposed within said cup-shaped valve member portion for yielding engagement with said second valve seat, a flexible diaphragm marginally secured on the outlet side of said valve partition in the path of the fluid flow and having a centrally disposed raised metal portion thereon, means biasing said diaphragm toward said valve member and against the outlet pressure when said flow control member is in flow-permitting position, and connections between said diaphragm and said valve member comprising a valve stem extending through said unitary valve seat and guide member and formed with a threaded extension which extends through the aperture in said valve disc for engagement with said threaded aperture in said cup-shaped valve portion, said stem also being formed with radially extending shoulder, engagement of said stem to said cup-shaped portion causing said radial stem shoulder to abut and hold said resilient disc in fixed relation to said cup-shaped portion and said stem, said stem being rounded at the opposite end for abutting engagement with said metal portion of said diphragm, wherefore deenergization of said electroresponsive operator positions said flow control member in flow-preventing position which prevents all flow of fluid through said partition and tends to permit movement of said valve member away from said second seat, energization of said electroresponsive operator positions said flow control member in flow-permitting position and allows flow of fluid fuel through said valve partition, the rate of which is directly and continuously regulated by the fluid pressure on said diaphragm.

References Cited in the file of this patent

UNITED STATES PATENTS

| | | |
|---|---|---|
| 749,974 | Synnestvedt | Jan. 19, 1904 |
| 765,638 | Schramn | July 19, 1904 |
| 959,618 | Schmidt | May 31, 1910 |
| 1,160,285 | Hobbs | Nov. 16, 1915 |
| 1,587,969 | Ludeman | June 8, 1926 |
| 1,660,842 | Hoesel | Feb. 28, 1928 |
| 2,050,430 | Erickson | Aug. 11, 1936 |
| 2,054,481 | MacLean | Sept. 15, 1936 |
| 2,255,404 | White | Sept. 9, 1941 |
| 2,265,210 | Waddell | Dec. 9, 1941 |
| 2,333,913 | Beam | Nov. 9, 1943 |
| 2,335,824 | Dillman | Nov. 30, 1943 |
| 2,575,850 | Swickard | Nov. 20, 1951 |
| 2,604,901 | Trubert | July 29, 1952 |
| 2,616,451 | Hunter | Nov. 4, 1952 |

FOREIGN PATENTS

| | | |
|---|---|---|
| 501,132 | France | Jan. 17, 1920 |
| 709,856 | France | May 26, 1931 |
| 627,183 | Germany | Mar. 10, 1936 |
| 471,074 | Great Britain | Aug. 27, 1937 |
| 66,058 | Denmark | Dec. 15, 1947 |